US012289199B2

(12) United States Patent
Zhang et al.

(10) Patent No.: US 12,289,199 B2
(45) Date of Patent: Apr. 29, 2025

(54) PROVISIONING OF WIRELESS SECURITY CONFIGURATION INFORMATION IN A WIRELESS NETWORK ENVIRONMENT

(71) Applicant: Time Warner Cable Enterprises LLC, St. Louis, MO (US)

(72) Inventors: Qiang Zhang, Mclean, VA (US); Arun Manroa, Herndon, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 305 days.

(21) Appl. No.: 17/141,380

(22) Filed: Jan. 5, 2021

(65) Prior Publication Data
US 2021/0160128 A1 May 27, 2021

Related U.S. Application Data

(63) Continuation of application No. 15/333,462, filed on Oct. 25, 2016, now Pat. No. 10,951,466, which is a
(Continued)

(51) Int. Cl.
*H04L 41/08* (2022.01)
*H04L 41/0803* (2022.01)
(Continued)

(52) U.S. Cl.
CPC .......... *H04L 41/08* (2013.01); *H04L 41/0803* (2013.01); *H04L 41/0806* (2013.01);
(Continued)

(58) Field of Classification Search
CPC ..... H04W 4/001; H04L 41/0803–0809; H04L 63/0876
See application file for complete search history.

(56) References Cited

U.S. PATENT DOCUMENTS 8,089,953 B2   1/2012  Angelot et al.
9,226,177 B2  12/2015  Karaoguz et al.
(Continued)

*Primary Examiner* — Daniel B Potratz
(74) *Attorney, Agent, or Firm* — Armis IP Law, LLC

(57) ABSTRACT

A network environment includes a message-processing resource that receives a communication originated by a communication device and transmitted from the communication device over a wireless communication link. By way of non-limiting example, the communication can be a request for retrieval of content from server resource disposed in the network environment. The message-processing resource processes the communication transmitted over the wireless communication link to identify a network address assigned to the communication device. The message-processing resource maps the network address to corresponding status information associated with the communication device. In response to detecting status information indicating that the communication device has not yet been configured with configuration information supporting secured wireless communications of a particular type, the message-processing resource: initiates generation of configuration information supporting subsequent secured wireless communications between the communication device and a corresponding wireless access point, and forwards the configuration information to the communication device.

16 Claims, 9 Drawing Sheets

900

INITIATE TRANSMISSION OF A COMMUNICATION FROM A MOBILE COMMUNICATION DEVICE OVER A WIRELESS COMMUNICATION LINK TO A RESPECTIVE WIRELESS ACCESS POINT TO RETRIEVE REQUESTED CONTENT FROM A SERVER RESOURCE IN A NETWORK — 910

IN RESPONSE TO TRANSMITTING THE COMMUNICATION, RECEIVE CONFIGURATION INFORMATION GENERATED BY A PROVISIONING RESOURCE IN THE NETWORK — 920

UTILIZE THE RECEIVED CONFIGURATION INFORMATION TO CONFIGURE THE MOBILE COMMUNICATION DEVICE TO SUPPORT SUBSEQUENT SECURED WIRELESS COMMUNICATIONS — 930

Related U.S. Application Data continuation of application No. 14/245,179, filed on Apr. 4, 2014, now Pat. No. 9,554,272.

(51) Int. Cl.
| | |
|---|---|
| *H04L 41/0806* | (2022.01) |
| *H04W 8/18* | (2009.01) |
| *H04W 8/20* | (2009.01) |
| *H04W 12/06* | (2021.01) |
| *H04L 9/40* | (2022.01) |
| *H04W 84/12* | (2009.01) |

(52) U.S. Cl.
CPC ............... *H04W 8/18* (2013.01); *H04W 8/20* (2013.01); *H04W 12/068* (2021.01); *H04L 63/083* (2013.01); *H04L 63/0876* (2013.01); *H04W 84/12* (2013.01)

(56) References Cited

U.S. PATENT DOCUMENTS

| | | | |
|---|---|---|---|
| 9,251,280 B1 * | 2/2016 | Upadhyay | G06F 16/9562 |
| 9,270,654 B2 | 2/2016 | Marmolejo-Meillon et al. | |
| 9,408,070 B2 | 8/2016 | Altbaum et al. | |
| 2013/0007853 A1 | 1/2013 | Gupta et al. | |
| 2013/0024921 A1 * | 1/2013 | Gupta | H04L 41/0806 |
| | | | 726/6 |
| 2013/0250801 A1 | 9/2013 | Kennedy et al. | |
| 2013/0333016 A1 * | 12/2013 | Coughlin | H04L 63/083 |
| | | | 709/227 |
| 2014/0297820 A1 * | 10/2014 | Grubis | H04W 12/02 |
| | | | 709/222 |

\* cited by examiner

| DEVICE NETWORK ADDRESS | ACCOUNT INFORMATION | CONFIGURED TO SUPPORT SECURED WIRELESS COMMNS.? |
|---|---|---|
| ABCD | 15523456-12 | NO |
| BCYZ | 15522677-17 | YES |
| ABBB | 15443456-12 | NO |
| CBAD | 36773566-14 | NO |
| ... | ... | ... |

MAPPING INFO. 175

STATUS INFO. 225

FIG. 2

| ACCOUNT INFORMATION | SUBSCRIBER CREDENTIALS |
|---|---|
| 15523456-12 ........ | 330-1 |
| 15522677-17 ........ | 330-2 |
| 15443456-12 ........ | 330-3 |
| 36773566-14 ........ | 330-4 |
| ... | ... |

SUBSCRIBER INFO. 177

FIG. 3

PROVISIONING OF WIRELESS SECURITY CONFIGURATION INFORMATION IN A WIRELESS NETWORK ENVIRONMENT

RELATED APPLICATION

This application is a continuation application of earlier filed U.S. patent application Ser. No. 15/333,462 entitled "PROVISIONING OF WIRELESS SECURITY CONFIGURATION INFORMATION IN A WIRELESS NETWORK ENVIRONMENT," filed on Oct. 25, 2016, the entire teachings of which are incorporated herein by this reference.

U.S. patent application Ser. No. 15/333,462 is a continuation application of earlier filed U.S. patent application Ser. No. 14/245,179 (U.S. Pat. No. 9,554,272) entitled "PROVISIONING OF WIRELESS SECURITY CONFIGURATION INFORMATION IN A WIRELESS NETWORK ENVIRONMENT," filed on Apr. 4, 2014, the entire teachings of which are incorporated herein by this reference.

BACKGROUND

Conventional computer devices typically have the ability to identify a presence of WiFi™ access points. For example, according to current technology, to learn of one or more access points in a region, a computer device can transmit a wireless query signal (e.g., a probe request). In response to the wireless signal, any of one or more active WiFi™ network access points in the region will respond with information indicating their identities. Accordingly, via the response information from the access points, the operator of the computer can identify which, if any, WiFi™ networks are available for use in the region.

After identifying available WiFi™ networks, the computer device can initiate display of the identities of the different WiFi™ networks on a display screen. In such an instance, the user of the computer can manually select from a listing of the available WiFi™ networks in which to connect. If the WiFi™ access point is an open WiFi™ network, the user will not need to provide a password to be granted access to the Internet through the selected WiFi™ access point. Alternatively, in certain instances, the user may be required to provide appropriate credentials (such as username, password, etc.) to use the wireless access point if restrictions have been imposed on use of the wireless access point.

If used, a downside of open networks is that illegitimate users (a.k.a., hackers) can potentially eavesdrop on respective wireless communications between a computer device and a respective WiFi™ access point. Via eavesdropping, an illegitimate user may be able to learn of a respective network address associated with the computer device. Using the network address, the illegitimate user may be able to control use of the communication link or steal data. Thus, unsecured wireless communications (such as WiFi™ communications) are undesirable.

To alleviate and/or prevent hacking of wireless communications, several wireless communication protocols have been established for use in WiFi™ applications to provide more secured wireless communications. For example, the EAP (Extensible Authentication Protocol) is a desired protocol for use in wireless network applications. The EAP protocol expands on authentication methods used by the Point-to-Point Protocol (PPP), a protocol often used when connecting a computer to the Internet.

In general, to communicate in accordance with EAP, a user requests to establish a connection to with a respective wireless access point. The wireless access point requests that the user of the communication device provide identification information. The wireless access point forwards the identification information received from the user to an authentication server. The authentication server challenges the user of the communication device to provide proof of the validity of the provided identification information. The wireless access point receives and forwards authentication information (such as password, etc.) received from the user to the authentication server. If the authentication information is correct for the corresponding identity of the communication device, the authentication server notifies the wireless access point to allow the user of the communication device access to access the Internet through the wireless access point.

BRIEF DESCRIPTION OF EMBODIMENTS

Conventional use of WiFi™ suffers from a number of deficiencies. For example, in order to implement a security protocol such as EAP (Extensible Authentication Protocol) without the user having to provide manual input each time the user uses WiFi™, a respective communication device must be properly configured. Often times, configuring a respective communication device to support a desired wireless security protocol such as EAP requires at least a certain amount of manual processing on a part of the operator of the communication device. In other words, a new user requesting access to the Internet through a wireless access point may need to go through multiple steps to sign up for a set of WiFi™ user credentials in order to start using a respective secured WiFi™ service.

For non-savvy computer users, the task of providing credentials and/or configuring a respective communication device to support secured wireless communications may be somewhat difficult. Even for savvy computer users, performing steps needed to sign up a communication device for use of wireless services such as WiFi™ is an undesirable impediment to using network services. Typically, a user of a network access plan would like to be able to open a respective application such as a browser and be provided immediate, secured access to a network through a wireless access point without having to go through a process of manually providing credentials such as username, password, etc., to access a respective network such as the Internet.

Embodiments herein deviate with respect to conventional techniques and hurdles associated with being provided secured wireless access when accessing a network through a wireless access point.

For example, in one embodiment, a network environment includes message-processing resource that receives a communication originated by a communication device. Assume in this example embodiment that the message-processing resource receives the communication after the communication has been transmitted from the communication device over a wireless communication link to a respective wireless access point. In one embodiment, the communication originated by the communication device is directed to a server resource for retrieval of content such as a webpage.

The wireless communication link (between the communication device and the respective wireless access point) over which the communication is transmitted can be established any suitable manner. For example, the communication device can be configured to establish the wireless communication link using an open SSID (Service Set Identifier) in which case the wireless access point supports open authentication and use of the wireless access point; the wireless communication link can be established using a secured SSID (allocated for temporary use by the user) in which the respective wireless access point supports secured authentication and access to the wireless access point; etc.

In one non-limiting example embodiment, the message-processing resource that receives the communication generated by the communication device is a gateway resource (in communication with the wireless access point) providing the communication device access to a network such as the Internet. The message-processing resource processes the communication to identify a network address assigned to the communication device that transmitted the message. The message-processing resource then initiates mapping of the network address to status information to learn whether the corresponding communication device has been configured to support a desired type of secured wireless communication protocol (such as EAP or other suitable protocol).

Assume that, via the network address information, the message-processing resource detects that a subscriber of a network access plan operates the communication device and that communication device has not yet been configured to support secured wireless communications of a particular type with a respective wireless access point. In response to detecting status information indicating that the communication device has not yet been configured with configuration information supporting secured wireless communications of the particular type, the message-processing resource initiates generation of configuration information supporting subsequent secured wireless communications between the communication device and a corresponding wireless access point.

In accordance with further embodiments, to initiate configuring the communication device so that it supports secured wireless communications of a desired type, the message-processing resource notifies a provisioning resource in the network environment that the communication device has not yet been configured to support a secured wireless protocol such as EAP or other suitable protocol. In one embodiment, the message processing resource redirects the originally received communication to the provisioning resource instead of or in addition to a respective server resource to which the communication was originally directed.

In response to receiving the notification, the provisioning resource generates the configuration information supporting subsequent secured wireless communications. Potentially unbeknownst to the operator of the communication device, the provisioning resource then transmits or downloads the configuration information to the communication device to control wireless security associated with subsequent communications from the communication device. Provisioning of the configuration information to the communication device enables the communication device to subsequently communicate via secured wireless communications such as EAP or other suitable protocol as supported by the configuration information.

Thus, in response to transmitting the communication (such as content request message) as initially discussed above, the communication device can receive configuration information generated by a provisioning resource in the network in addition to or in lieu of receiving the requested content from the specified server to which the communication is originally intended. The communication device utilizes the received configuration information to configure the mobile communication device to support subsequent secured wireless communications. In one embodiment, when establishing a subsequent wireless communication link with a respective wireless access point, the communication device uses the configuration information to establish the wireless communication link in accordance with a specified wireless protocol.

Embodiments herein are useful over conventional techniques. For example, an operator (such as subscriber) of the communication device may subscribe to a network access plan provided by a given service provider. The service provider may have many wireless access points available across a geographical region for use by the subscriber to access the Internet in accordance with a respective network access plan. As previously discussed, the message-processing resource operated by the service provider can be configured to detect when one of its subscriber has not yet been configured to support a desired secured wireless protocol. For instance, the communication device operated by the user may be a new device that has not yet been configured. Automatic provisioning (detecting, generating, downloading, etc.) of configuration information enables a respective communication device to be automatically configured (potentially unbeknownst to the operator) for subsequent secured wireless communications on any of the service provider's wireless access points.

The configuration information provisioned to the communication device can include appropriate credentials such as username, password, etc., enabling secured communications with a wireless access point. The communication device uses this information such as username, password, etc., to establish a secured wireless communication link. The operator benefits because the provisioning is at least partially automatic, alleviating the burden of the operator from having to manually configure the communication device. Additionally, when the user operates the communication device to access any of the service provider's wireless access points, the communication device can be automatically configured (potentially unbeknownst to the user) using provisioned configuration information. This alleviates the user of the communication device from having to manually provide the access credentials (username, password, etc.) to establish a secured communication link.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment as described herein includes a computer readable storage medium, system, hardware, etc., having instructions stored thereon. The instructions, when executed by computer processor hardware, cause the computer processor hardware of the system to: receive a communication originated by a communication device, the communication transmitted from the communication device over a wireless communication link; process the communication received over the wireless link; and in response to detecting status information indicating that the communication device has not yet been configured with configuration information supporting secured wireless communications, initiate generation of the configuration information.

Another embodiment as described herein includes computer readable storage medium, system, hardware, etc., having instructions stored thereon. The instructions, when executed by computer processor hardware, cause the computer processor hardware of the system to: initiate transmission of a communication from a mobile communication device over a wireless communication link to a respective wireless access point to retrieve requested content from a server resource in a network; in response to transmitting the communication, receive configuration information generated by a provisioning resource in the network; and utilize the received configuration information to configure the mobile communication device to support subsequent secured wireless communications.

Yet other embodiments herein include a computer readable storage medium, system, hardware, etc., having instructions stored thereon. The instructions, when executed by computer processor hardware, cause the computer processor hardware of the system to: process a communication to identify a network address of a communication device that transmitted the communication over a wireless communication link; and in response to detecting, based on the network address, that the communication device is operated by a subscriber of a network access plan: i) generate configuration information, and ii) initiate download of the configuration information to the communication device to control wireless security associated with subsequent communications from the communication device.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for implementing a message-processing resource or wireless gateway to provision configuration information to user devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 2 is an example diagram illustrating mapping information according to embodiments herein.

FIG. 3 is an example diagram illustrating subscriber information according to embodiments herein.

Figure 1:
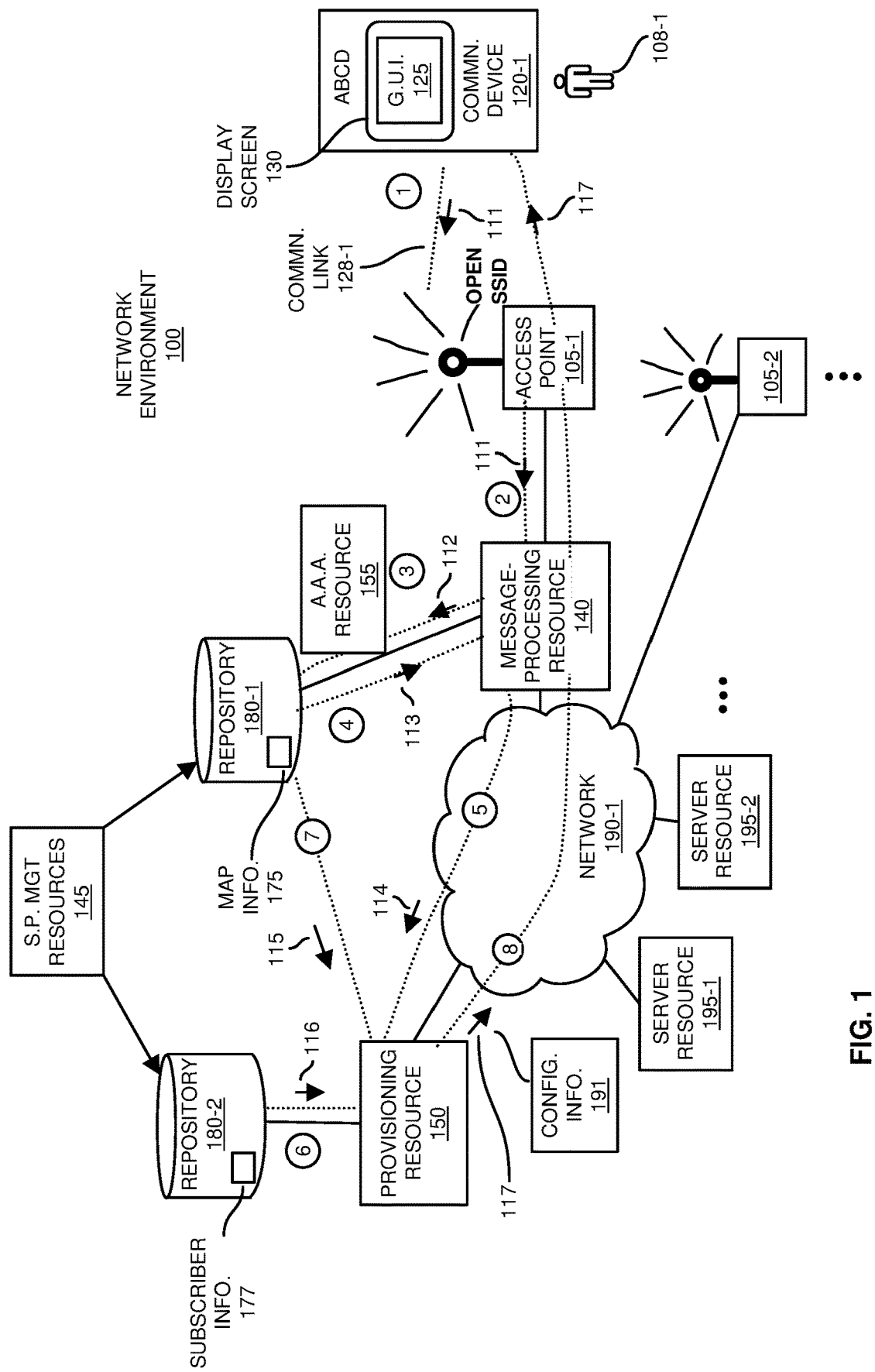
FIG. 1 is an example diagram illustrating a network environment and provisioning of configuration information supporting secured wireless communications according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

The disclosure of U.S. patent application Ser. No. 14/245,179 filed Apr. 4, 2014 entitled PROVISIONING OF WIRE- LESS SECURITY CONFIGURATION INFORMATION IN A WIRELESS NETWORK ENVIRONMENT is hereby incorporated herein by reference in its entirety.

As previously discussed, a network environment includes a message-processing resource such as a gateway resource that receives a communication originated by a communication device and transmitted from the communication device over a wireless communication link. By way of non-limiting example, the communication can be a request for retrieval of content from server resource disposed in the network environment. The message-processing resource processes the communication transmitted over the wireless communication link to identify a network address assigned to the communication device. The message-processing resource maps the network address to corresponding status information associated with the communication device. In response to detecting status information indicating that the communication device has not yet been configured with configuration information supporting secured wireless communications of a particular type, the message-processing resource initiates generation of configuration information supporting subsequent secured wireless communications between the communication device and a corresponding wireless access point. The message-processing resource then forwards the configuration information to the communication device. The configuration information configures the communication device for subsequent use.

Now, more specifically, FIG. 1 is an example diagram illustrating a network environment according to embodiments herein. Note that each of the resources such as the message-processing resource 140, communication device 120-1, provisioning resource 150, etc., represents or includes hardware, software, or a combination of hardware and software to carry out functionality as discussed herein.

As shown in this example embodiment, network environment 100 includes at least packet-switched network 190-1 facilitating distribution of communications (such as one or more data packets) in accordance with any suitable communication protocol. In one embodiment, packet-switched network 190-1 represents the Internet.

Message-processing resource 140 and wireless access point 105-1 enable communication device 120-1 operated by respective user 108-1 to communicate with and communicate with any of one or more remote resources such as server resource 195-1, server resource 195-2, etc., disposed in network 190-1.

In one embodiment, network environment 100 and corresponding resources therein supports switching of data packets using source and destination address information. For example, the source address of a communication such as a data packet indicates a corresponding resource from which the data packet is generated. A destination address of a communication indicates a corresponding address of the resource to which the data packet is being transmitted. The network 190-1 uses the destination address to route the respective data packets to an identified destination. The recipient of the communication uses the source addresses to identify a particular client that transmitted the communication.

In one embodiment, message-processing resource 140 is a gateway resource controlling access to network 190-1. The wireless access point 105-1 is communicatively coupled to message-processing resource 140 and can support wireless communications with respective communication devices via any suitable protocol or WiFi™ standards such as IEEE (Institute of Electrical and Electronics Engineers) 802.11a, 802.11b, 802.11g, 802.11n, etc.

In an upstream direction, such as in a direction outbound from the communication device 120-1, wireless access point 105-1 facilitates forwarding of communications from communication device 120-1 upstream through access point 105-1 to message-processing resource 140. Thereafter, message-processing resource 140 controls forwarding of the respective communications to network 190-1.

In a downstream direction, inbound to the communication device 120-1, the message-processing resource 140 facilitates distribution of communications received from resources in network 190-1 downstream and transmitted to wireless access point 105-1. Wireless access point 105-1 further transmits the received communications to the appropriate communication device (such as communication device 120-1) to which the communications are addressed.

Embodiments herein deviate with respect to conventional techniques and enable a respective user and service provider to overcome hurdles associated with configuring a respective communication device to support secured wireless access when accessing network 190-1 through wireless access point 105-1.

For example, an operator (such as user 108-1) of the communication device 120-1 may subscribe to a network access plan provided by a service provider. The service provider controls any or all of the resources in network environment 100. Subscription to the network access plan affords the user 108-1 use of any of one or more wireless access points 105 (provided by or controlled by the service provider in network environment 100) to access network 190-1 such as the Internet.

Assume in this example embodiment that the wireless access point 105-1 supports open authentication (open SSID). In such an instance, the user 108-1 is not required to provide a corresponding username and password to establish the communication link 128-1 between the communication device 120-1 and wireless access point 105-1. In this example embodiment, subsequent to establishing communication link 128-1, the communication device 120-1 is able to communicate over communication link 128-1 to wireless access point 105-1.

As further shown, communication device 120-1 can include display screen 130. The communication device 120-1 initiates establishing communication link 128-1 in response to the user executing a corresponding application (such as a browser application) on the communication device 120-1. In this example embodiment, the application executed on communication device 120-1 initiates display of graphical user interface 125 on display screen 130. User 108-1 provides input (such as a URL or Uniform Resource Locator) to communication device 120-1 and corresponding graphical user interface 125 to retrieve content available from one or more remote servers 195 in network environment 100.

In response to the application receiving the input from user 108-1 to retrieve content from a remote server resource, the communication device 120-1 transmits communication 111 over established wireless communication link 128-1 to wireless access point 105-1. Wireless access point 105-1, in turn, transmits the received communication 111 to message-processing resource 140. As previously discussed, the message-processing resource 140 can be configured to control user 108-1 access to network 190-1.

Message-processing resource 140 receives the communication 111 originated by communication device 120-1. As shown, the message-processing resource 140 receives the communication 111 (such as a request for retrieval of content) after the communication 111 has been transmitted from the communication device 110-1 over a wireless communication link 128-1 to a respective wireless access point 105-1.

As previously discussed, in one non-limiting example embodiment, the message-processing resource 140 that receives the communication 111 generated by the communication device 120-1 is a gateway resource (in communication with the wireless access point 105-1) controlling access to network 190-1 such as the Internet.

In this example embodiment, in furtherance of provisioning configuration information 191 to communication device 120-1, the message-processing resource 140 processes the received communication 111 to identify a network address assigned to the communication device 120-1 that transmitted the communication 111. The communication 111 includes a source network address (such as a MAC or Media Access Control address) associated with the communication device 120-1. Thus, the message-processing hardware 140 knows the unique identity (such as network address ABCD) of the communication device 120-1 that transmitted the request.

In this example embodiment, assume that the communication device 120-1 is assigned a network address of ABCD. Via processing of communication 111, the message-processing resource 140 detects that the corresponding communication 111 was generated by communication device 120-1 assigned network address ABCD. Further, as previously discussed, the communication 111 can include a destination address specifying a particular server such as server resource 195-1 as a target resource to which the communication 111 is directed.

Via communications 112, the message-processing resource 140 then initiates mapping of the network address ABCD (source address) in the received communication 111 to status information to learn whether the corresponding communication device 120-1 has been configured to support a desired type of secured wireless communication protocol (such as EAP or other suitable wireless security protocol). Repository 180-1 stores mapping information 175 (FIG. 2).

The mapping information 175 stored in repository 180-1 may or may not store information associated with the network address ABCD depending on whether the service provider detected prior use of the communication device 120-1 using its network resources to access network 190-1 such as the Internet. As shown, network environment 100 can include AAA (Authentication, Authorization and Accounting) server resource 155.

For instances in which the communication device 120-1 is new or used for the first time, AAA server resource 155 can be configured to challenge the user 108-1 to provide appropriate credentials such as a username and corresponding password provided by the service provider. AAA server resource 155 stores information indicating a username and password assigned to the respective subscriber. If the AAA server resource 155 detects that the password and username provided by the user 108-1 operating communication device 120-1 is correct, the AAA resource 155 can be configured to initiate storage of the network address ABCD in mapping information 175 stored in repository 180-1. If the network address ABCD is not currently stored in mapping information 175 indicating a valid user, the challenge to the user 108-1 to provide the credentials ensures that only authorized users are able to access network 190-1 through respective wireless access points 105. In other words, if the network address of the communication device 120-1 is currently not stored in mapping information 175 as a valid device operated by a subscriber and/or the user 108-1 cannot provide appropriate credentials when challenged, the user 108-1 would not be provided access to network 190-1 through wireless access point 105-1.

FIG. 2 is an example diagram illustrating mapping information according to embodiments herein. As shown in this example embodiment, mapping information 175 maps a respective network address assigned to a communication device to corresponding account information as well as corresponding status information 225 indicating whether or not the corresponding communication device 120-1 has been configured to support secured wireless communications in accordance with a desired security protocol such as EAP.

As shown in this example, mapping information 175 managed by the service provider indicates that: i) the network address ABCD is assigned to a corresponding communication device 120-1 operated by a subscriber assigned account number 15523456-12 and that the respective communication device 120-1 has not yet been configured to support secured wireless communications according to a particular secured wireless protocol; ii) the network address BCYZ is assigned to a corresponding communication device operated by a subscriber assigned account number 15522677-17 and that the respective communication device assigned network address BCYZ has already been configured to support secured wireless communications according to a particular secured wireless protocol; iii) the network address ABBB is assigned to a corresponding communication device operated by a subscriber assigned account number 15443456-12 and that the respective communication device assigned network address ABBB has not yet been configured to support secured wireless communications according to a particular secured wireless protocol; iv) the network address CBAD is assigned to a corresponding communication device operated by a subscriber assigned account number 36773566-14 and that the respective communication device assigned network address CBAD has already been configured to support secured wireless communications according to a particular secured wireless protocol; and so on.

Note that the mapping information 175 (stored in repository 180-1) and subscriber information 177 (stored in repository 180-2) can be generated and managed in any suitable manner. In one embodiment, any of one or more service provider management resources 145 populate the mapping information 175 and subscriber information 177 based on detecting prior usage (such as first use) of a respective communication device. Further details of managing and generating information such as mapping information 175 are discussed in related application entitled "CORRELATION OF COMMUNICATION DEVICES AND SUBSCRIBER INFORMATION," filed on the same day as the present application, the entire teachings of which are incorporated herein by this reference.

Referring again to FIG. 1, via the status information 225 in mapping information 175, the message-processing resource 140 detects that a subscriber of a corresponding network access plan (provided by the service provider) operates the communication device 120-1 and that communication device 120-1 has not yet been configured to support a desired wireless security protocol when the communication device 120-1 establishes a respective wireless communication link with a wireless access point provided by the service provider (such as a cable network service provider).

In one example embodiment, the communications 112 from message processing resource 140 to repository 180-1 include the network address ABCD retrieved from the communication 111. In response to receiving the address ABCD, the repository 180-1 maps the network address ABCD to corresponding subscriber information indicating whether the corresponding communication device 120-1 has been configured to support a protocol such as EAP. The repository 180-1 responds with communications 113 including a notification indicating that the communication device 120-1 has not yet been enabled to support the desired protocol such as EAP.

In response to detecting status information indicating that the communication device 120-1 has not yet been configured with configuration information supporting secured wireless communications of a particular type, the message-processing resource 140 initiates provisioning of configuration information 191 to communication device 120-1. In other words, as further discussed below, the message-processing resource 140 initiates generation and distribution of the configuration information 191 (by provisioning resource 150) to the communication device 120-1 in response to detecting that the communication device 120-1 has not yet been configured with the configuration information 120-1 and that the user 108-1 is a subscriber.

To initiate configuring the communication device 120-1 so that it supports future secured wireless communications of a desired type (such as EAP), via communications 114, the message-processing resource 140 notifies provisioning resource 150 in the network environment 100 that the communication device 120-1 has not yet been configured to support a secured wireless protocol such as EAP or other suitable protocol.

As previously discussed, the communication 111 may be a request for content (such as webpage information) from a server resource 195-1. Accordingly, the communication 111 (generated to retrieve content such as a webpage) may be unrelated to provisioning of corresponding configuration information 191 to configure communication device 120-1.

In one embodiment, in furtherance of provisioning configuration information 191, via communications 114, and in response to detecting that the communication device 120-1 has not yet been configured, the message processing resource 140 redirects the received communication 111 to the provisioning resource 150 instead of transmitting the communication 111 to a respective server resource 195-1 to which the communication 111 was originally directed.

As an alternative, note that the message processing resource 140 can redirect the received communication 111 to the provisioning resource 140 in addition to transmitting the communication 111 to a respective server resource 195-1 to which the communication 111 was originally directed. In this latter instance, the corresponding user 108-1 will receive the requested webpage from server resource 195-1 as well as receive corresponding configuration information 191 after the message-processing hardware detects that it has not yet been configured.

Redirecting the communication 114 to provisioning resource 150 can be achieved in any suitable manner. For example, redirecting of a received communication 111 can be achieved via browser messaging, automatic layer 4 redirecting, etc.

In response to receiving the notification via communications 114, the provisioning resource 160 generates the configuration information 191 supporting subsequent secured wireless communications. For example, in one embodiment, the provisioning resource 160 receives communications 114. Communications 114 can include the network address ABCD of the communication device 120-1.

The provisioning resource 150 uses the network address ABCD to access mapping information 175 and retrieve (via mapping) account information (such as 15523456-12) associated with the user 108-1 of communication device 120-1. For example, the provisioning resource 160 forwards the network address ABCD to repository 180-1. Via communications 115, the repository 180-1 forwards the account information associated with the user 108-1 operating communication device 120-1 to provisioning resource 150.

The provisioning resource 150 additionally accesses subscriber information 177 stored in repository 180-2. FIG. 3 is an example diagram illustrating a mapping of subscriber information to corresponding subscriber credentials according to embodiments herein.

Subscriber credentials 330 associated with a respective subscriber account can include any suitable information such as a respective username assigned to the user, password assigned to the user, etc., for accessing network 190-1.

In this non-limiting example embodiment, the account as specified by account information 15523456-12 maps to corresponding subscriber credentials 330-1; the account as specified by account information 15522677-17 maps to corresponding subscriber credentials 330-2; the account as specified by account information 15443456-12 maps to corresponding subscriber credentials 330-3; the account as specified by account information 36773566-14 maps to corresponding subscriber credentials 330-4; and so on.

Referring again to FIG. 1, the provisioning resource 150 uses the received account information (such as 15523456-12) to retrieve subscriber credentials 330-1 associated with user 108-1. For example, the provisioning resource 150 communicates the account information 15523456-12 to repository 180-2. In response to receiving the query, the repository 180-2 maps the received account information 15523456-12 to corresponding subscriber credentials 330-1 (such as access credentials associated with the user 108-1 enabling the user 108-1 to access the network 190-1 via respective one or more wireless access points 105).

In accordance with further embodiments, the provisioning resource 150 can be configured to determine a device type of communication device 120-1. This can be done in any suitable manner. In one embodiment, the provisioning resource 150 determines the device type via communications with a browser user agent.

The provisioning resource 150 uses the received subscriber credentials 330-1 (such as username, password, etc.) associated with the user 108-1 to produce configuration information 191. As previously discussed, provisioning resource 150 generates the configuration information 191 for configuring the corresponding communication device 120-1.

As further shown in FIG. 1, subsequent to creating configuration information 191 (including information such as a username, password, SSID name, etc.) based at least in part subscriber credentials 330-1, the provisioning resource 150 (such as a self-provisioning web portal) initiates transmission of the configuration information 191 (such as a secured WiFi™ user profile) to the communication device 120-1 via communications 117. In one embodiment, the provisioning resource 160 transmits the configuration 191 over network 190-1 to message processing resource 140; message-processing resource 140 further transmits the configuration information 191 to wireless access point 105-1; wireless access point 105-1 forwards the configuration information 191 over communication link 128-1 to communication device 120-1. The configuration information 191 configures the communication device 120-1.

In one embodiment, the service provider initiates provisioning of the configuration information 191 to the communication device 120-1 unbeknownst to the user 108-1. For example, an application executed in the communication device 120-1 can be configured to receive the configuration information 191 and program the communication device 120-1 to support subsequent establishing a respective wireless communication in accordance with the EAP protocol as specified by the configuration information 191. If desired, the application can be configured to initiate display of a corresponding notification on display screen 130 indicating that the communication device 120-1 has been provisioned configuration information 191 and that subsequent communications with an access point managed by the service provider will be transmitted in accordance with a secured wireless communication protocol such as EAP or other suitable protocol.

In one embodiment, the communication device 120-1 receives the configuration information 191 in lieu of receiving the requested content as indicated by communication 111. In accordance with another embodiment, the communication device 120-1 receives both the configuration information 191 for configuring communication device 120-1 as well as receives the requested content from server resource 195-1 in response to transmitting the communication 111.

Subsequent to being configured with configuration information 191, assume that the user 108-1 of communication device 120-1 initiates establishing a wireless communication link with wireless access point 105-2. In such an instance, the user may execute a corresponding browser application to retrieve content from one or more server resource 195 in the network 190-1.

During a process of establishing the wireless communication link with access point 105-2, potentially unbeknownst to the user 108-1, the communication device 120-1 uses the information in the configuration information 191 to establish the wireless communication link in accordance with a protocol such as EAP. To this end, when establishing the wireless communication link with wireless access point 105-2, the communication device transmits credentials in the configuration information 191 such as a username, password, etc., associated with the user 108-1 to wireless access point 105-2 to establish the respective wireless communication link in accordance with the EAP protocol. Thus, the communication device 120-1 initially may not be configured to support a desired wireless security protocol. However, after initial use of the device, and detecting that the communication device 120-1 has not yet been configured in a desired manner, embodiments herein include automatically provisioning corresponding configuration information ensuring that subsequent wireless communications from the communication device are secured. In such an instance, the respective subscribers operating communication devices in network environment 100 need not be burdened with having to manually configure their respective devices because provisioning can occur automatically on behalf of the subscribers.

Figure 4:
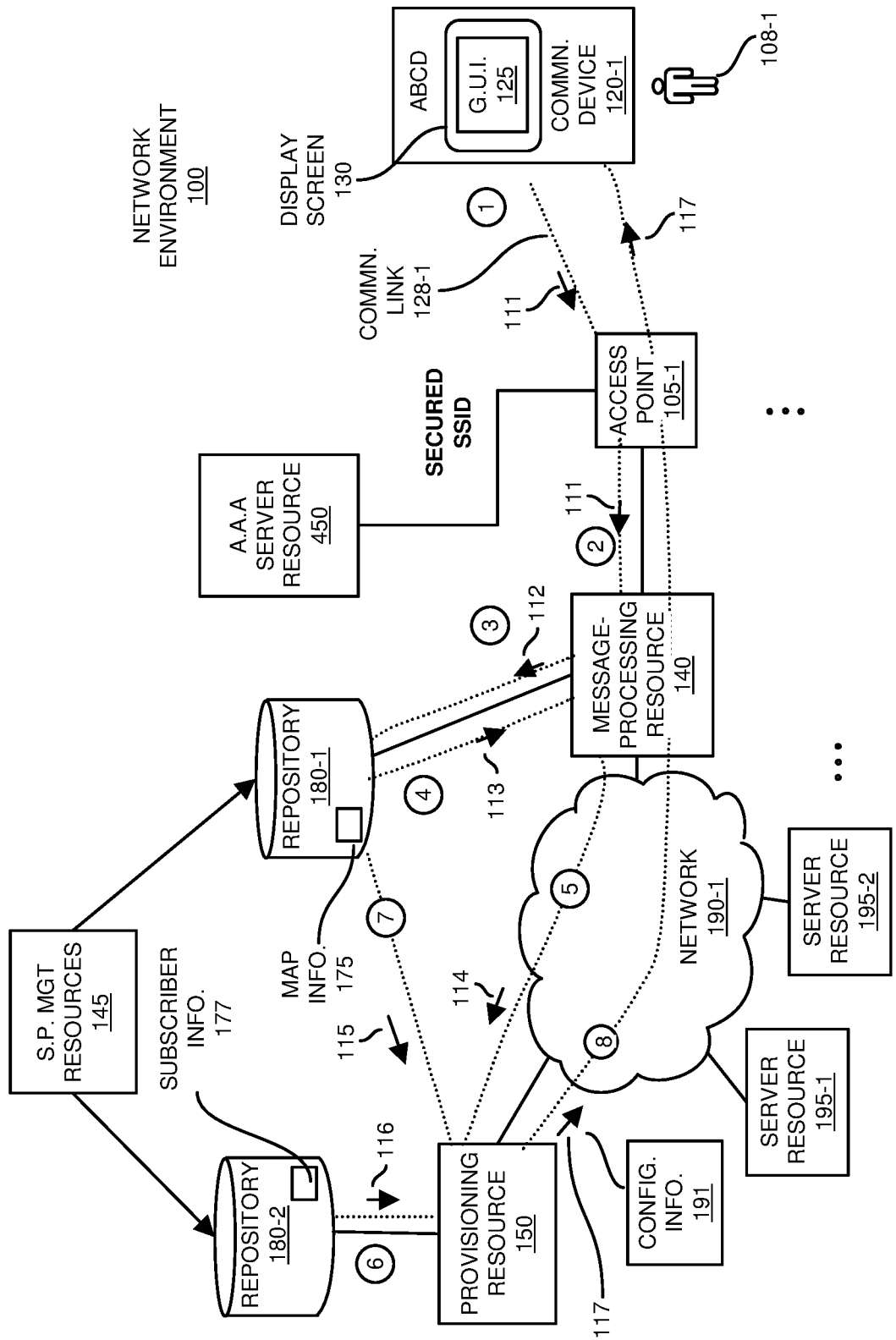
FIG. 4 is an example diagram illustrating a network environment and provisioning of configuration information supporting secured wireless communications according to embodiments herein.

FIG. 4 is an example diagram illustrating a network environment and provisioning of configuration information supporting secured wireless communications according to embodiments herein.

In this example embodiment, assume that the communication device 120-1 has not yet been provisioned corresponding configuration information as discussed above. Assume further that the user 108-1, via a respective guest account, has been authorized to access network 190-1 using any of the wireless access points 105 operated by a corresponding service provider. In one embodiment, the user 108-1 receives a username and corresponding password in order to use the respective guest account to establish communication link 128-1 in accordance with a secured SSID.

The user 108-1 can receive username and password associated with a respective guest account in any suitable manner. For example, the user 108-1 receives the username corresponding password via an email; the communication device 120-1 can be pre-configured with the appropriate username and corresponding password information; the communication device 120-1 can be configured with the username and password upon installation downloaded application; and so on.

In this example embodiment as shown in FIG. 4, prior to generating communication 111, the communication device 120-1 communicates with wireless access point 105-1 to establish wireless communication link 120-1. Assume that the wireless access point 105-1 supports secured wireless communications such as EAP or other suitable protocol. Upon receiving a request to establish the communication link 120-1, the wireless access point 105-1 forwards a respective network address ABCD assigned to communication device 120-1 to AAA server resource 150 (if present). AAA server resource 150 communicates a challenge through wireless access point 105-1 to communication device 120-1. At such time, the user 108-1 (or communication device 120-1) communicates the username and corresponding password associated with the guest account to AAA server resource 450.

AAA server resource 450 has access to credentials that have been assigned to different users in network environment 100 that have been granted a corresponding guest account. In this example embodiment, since the user 108-1 has been granted use of a corresponding guest account, the AAA server resource 150 enables the communication device 120-1 to establish the wireless communication link 128-1 in accordance with an appropriate secured wireless protocol (secured SSID). Thus, wireless communications transmitted over wireless communication link 128-1 are generally secured against hacking.

Subsequent to establishing the wireless communication link 128-1, in a manner as previously discussed above with respect to FIG. 1, the user 108-1 operates the communication device 120-1 to communicate with one or more resources in network 190-1 through message processing resource 140. Further in a manner as previously discussed, the message processing resource 140 can be configured to initiate provisioning of corresponding configuration information 191 for downloading to communication device 120-1 in response to detecting that the user 108-1 of communication device 120-1 is a corresponding subscriber of a network access plan provided by a service provider providing the user 108-1 access to network 190-1 via any number of different wireless access points (such as based on WiFi™).

Accordingly, provisioning resource 150 can be configured to receive notification to generate the configuration information 191 in response to message processing resource 140 detecting, based on processing of the communication 111, that the user 108-1 of the mobile communication device 120-1 is a subscriber to a network access plan provided by the service provider.

Thus, via respective guest accounts, both non-subscribers and subscribers can be afforded access to network 190-1 via one or more access points 105 provided by a corresponding service provider. In an instance in which the message-processing resource 140 detects that the communication device 120-1 is operated by a subscriber of a network access plan of the service provider, the message-processing resource 140 provides notification to provisioning resource 150 in a manner as previously discussed to provision corresponding configuration information 191 for use by the communication device 120-1 to support subsequent secured wireless communications such as EAP.

Alternatively, note that in an instance when the message-processing resource 140 detects that a corresponding communication device (using a respective guest account to access a respective wireless access point) is not a subscriber because the network address of the communication device is not in the mapping information 175, embodiments herein include preventing generation and distribution of corresponding configuration information 191 to the communication device. In other words, in this latter instance in which a corresponding communication device assigned use of a guest account has not been detected as being a subscriber of a respective service provider managing access point 105-1, the message-processing resource 140 merely provides the corresponding communication device 120-1 access to network 190-1 (potentially data rate limited, length of guest account usage may be limited to a month, etc.) without provisioning configuration information 191.

Figure 5:
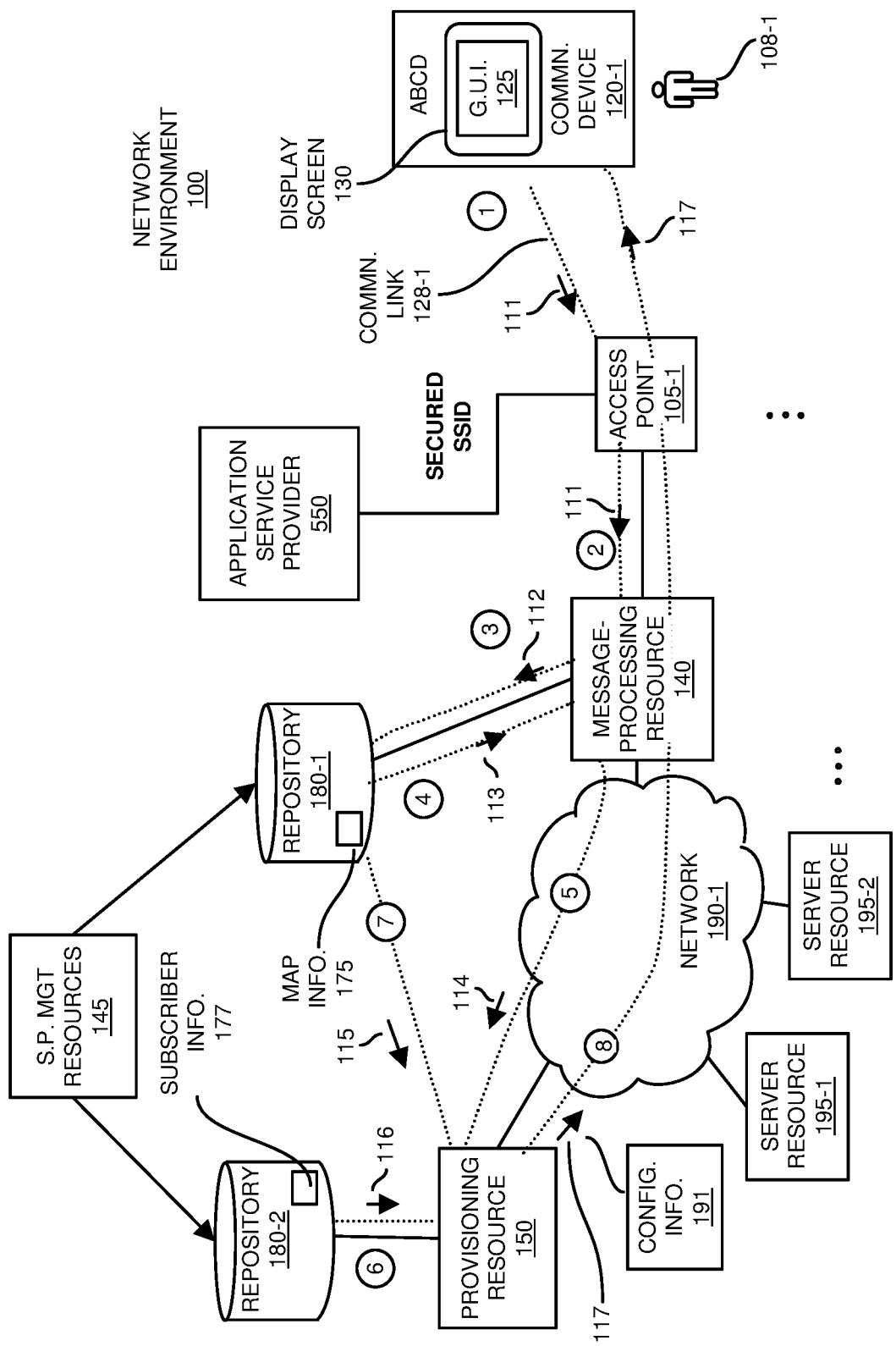
FIG. 5 is an example diagram illustrating a network environment and provisioning of configuration information supporting secured wireless communications according to embodiments herein.

FIG. 5 is an example diagram illustrating a network environment and provisioning of configuration information supporting secured wireless communications according to embodiments herein.

In this example embodiment, assume that the communication device 120-1 has not yet been provisioned corresponding configuration information as discussed above. Assume further that the communication device 120-1 operated by user 108-1 has been pre-configured with credentials enabling a respective user 108-1 access to network 190-1 using any of the wireless access points 105 operated by a corresponding service provider. In one embodiment, a manufacture of the communication device 120-1 may offer temporary usage of wireless network services such as WiFi™ (via wireless access points 105) to the user 108-1 as an incentive for purchasing the communication device 120-1. Pre-stored credentials in the communication device 120-1 can include a username and corresponding password enabling the user 108-1 to establish communication link 128-1 in accordance with a secured SSID.

The service provider keeps track of the credentials on a respective communication device as installed by a communication device manufacturer. In other words, a communication device manufacturer can program a respective newly manufactured device with credentials enabling the user to temporarily use wireless access points managed by a respective service provider.

In accordance with a respective agreement, the service provider provides temporary wireless services to the communication device. In one embodiment, the operator of a respective communication device can receive extended use of network access such as by purchasing one or more applications, etc., from application service provider 550. In such an instance, the party receiving revenue from the one or more applications purchased by the user operating a respective communication device may pay fees to the service provider to extend the temporary wireless services to the purchaser of the one or more applications.

In this example embodiment as shown in FIG. 5, prior to generating communication 111, the communication device 120-1 communicates with wireless access point 105-1 to establish wireless communication link 128-1. In this example embodiment, the wireless access point 105-1 supports secured wireless communications such as EAP or other suitable protocol. Upon receiving a request to establish the communication link 120-1, the wireless access 105-1 forwards a respective network address ABCD assigned to communication device 120-1 to application service provider 550. Application service provider 550 communicates a challenge through wireless access point 105-1 to communication device 120-1. At such time, the user 108-1 (or communication device 120-1) communicates the username and corresponding password associated with the temporary account to application service provider 550.

Application service provider 550 has access to credentials that have been installed by the manufacturer on respective communication devices that are to be granted temporary access to network 190-1 via use of wireless access points 105. In this example embodiment, assume that the communication device 120-1 has been granted temporary use of wireless access points 105 such as because the user 108-1 purchased the communication device 120-1 from a specific manufacturer. In this instance, the application service provider 550 enables the communication device 120-1 to establish the wireless communication link 128-1 in accordance with an appropriate secured wireless protocol. Thus, communications transmitted over wireless communication link 128-1 are secured against hacking.

Subsequent to establishing the wireless communication link 128-1, in a manner as previously discussed above with respect to FIG. 1, assume that the user 108-1 operates the communication device 120-1 to communicate with one or more resources in network 190-1 through message processing resource 140. Further in a manner as previously discussed, the message processing resource 140 can be configured to initiate provisioning of corresponding configuration information 191 for downloading to communication device 120-1 in response to detecting that the user 108-1 of communication device 120-1 is a corresponding subscriber of a network access plan provided by service provider providing the temporary access.

Thus, via temporary secured wireless services enabled by application service provider 550, both non-subscribers and subscribers can be afforded access to network 190-1 via one or more access points 105 provided by a corresponding service provider. In an instance in which the message-processing resource 140 detects via communication 111 that the communication device 120-1 is a subscriber, because the network address ABCD is founding mapping information 175 stored in repository 180-1, the message-processing resource 140 provides notification to provisioning resource 150 in a manner as previously discussed to provision corresponding configuration information 191 for use by the communication device 120-1 to support subsequent secured wireless communications such as EAP.

Alternatively, in an instance such as when the message-processing resource 140 detects that a corresponding communication device (provided temporary usage of the service provider's resources) is not a subscriber because the network address of the communication device is not in the mapping information 175, embodiments herein include preventing generation and distribution of corresponding configuration information 191 to the respective communication device. In other words, in this latter instance in which a corresponding communication device allowed temporary usage has not been detected as being a subscriber, the message-processing resource 140 merely provides the corresponding communication device access to network 190-1 via security provided by application service provider 550 without provisioning configuration information 191.

Figure 6:
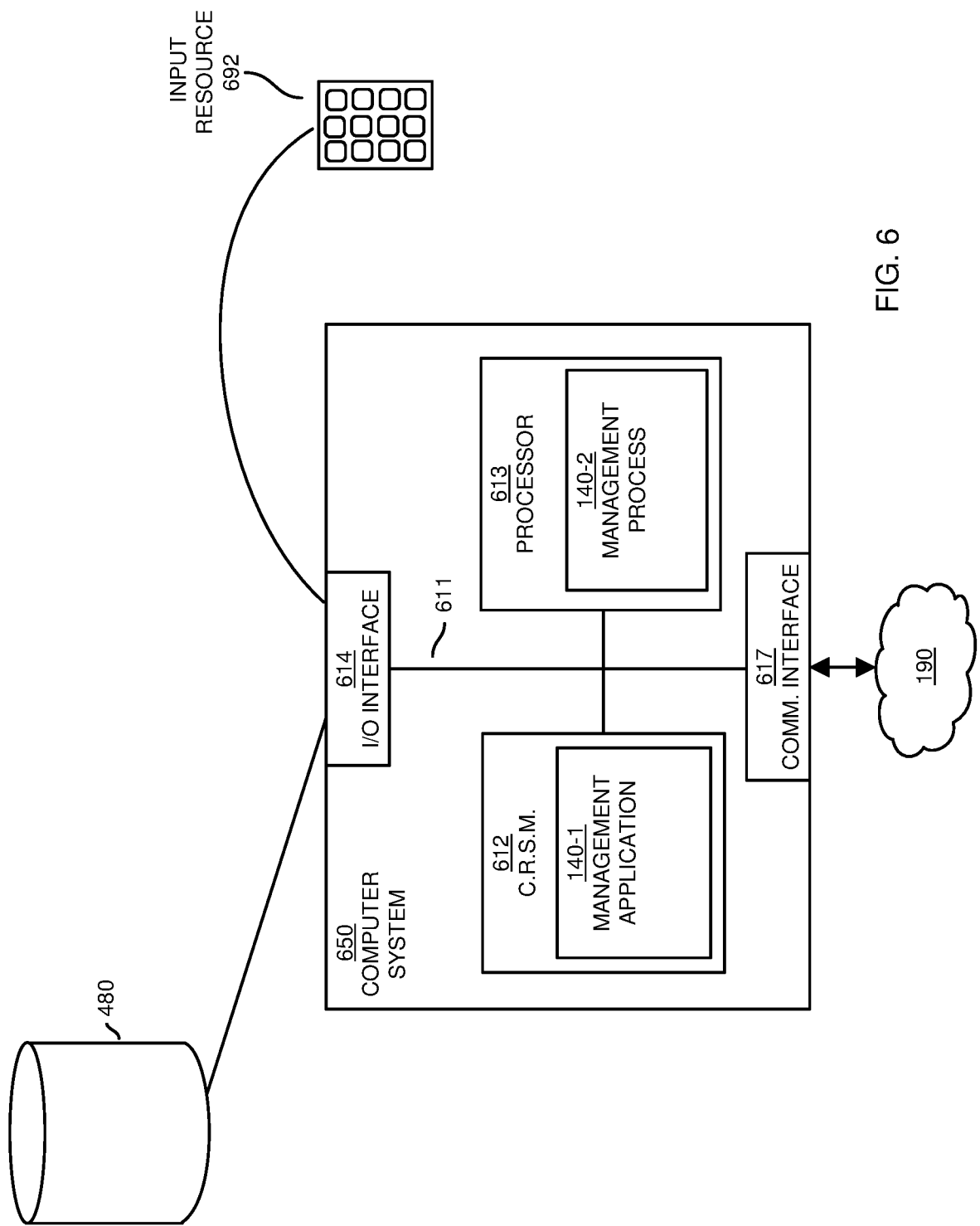
FIG. 6 is an example diagram illustrating a computer system to carry out operations according to embodiments herein.

FIG. 6 is a diagram illustrating an example computer architecture in which to execute any of the functionality according to embodiments herein. Any of the different processing techniques can be implemented via execution of software code on computer processor hardware.

For example, as shown, computer system 650 (e.g., computer processor hardware) of the present example can include an interconnect 611 that couples computer readable storage media 612 such as a non-transitory type of media (i.e., any type of hardware storage medium) in which digital information can be stored and retrieved. The computer system 650 can further include processor 613 (i.e., computer processor hardware such as one or more processor co-located or disparately located processor devices), I/O interface 614, communications interface 617, etc.

Computer processor hardware (i.e., processor 613) can be located in a single location or can be distributed amongst multiple locations.

As its name suggests, I/O interface 614 provides connectivity to resources such as repository 480, control devices (such as controller 792), one or more display screens, etc.

Computer readable storage medium 612 can be any hardware storage device to store data such as memory, optical storage, hard drive, floppy disk, etc. In one embodiment, the computer readable storage medium 612 stores instructions and/or data.

Communications interface 617 enables the computer system 650 and processor resource 613 to communicate over a resource such as any of networks 190. I/O interface 614 enables processor resource 613 to access data from a local or remote location, control a respective display screen, receive input, etc.

As shown, computer readable storage media 612 can be encoded with management application 140-1 (e.g., software, firmware, etc.) executed by processor 613. Management application 140-1 can be configured to include instructions to implement any of the operations as discussed herein associated with message-processing resource 140.

During operation of one embodiment, processor 613 accesses computer readable storage media 612 via the use of interconnect 611 in order to launch, run, execute, interpret or otherwise perform the instructions in management application 140-1 stored on computer readable storage medium 612.

Execution of the management application 140-1 produces processing functionality such as management process 140-2 in processor resource 613. In other words, the management process 140-2 associated with processor resource 613 represents one or more aspects of executing management application 140-1 within or upon the processor resource 613 in the computer system 650.

Those skilled in the art will understand that the computer system 650 can include other processes and/or software and hardware components, such as an operating system that controls allocation and use of hardware resources to execute management application 140-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 650 may reside at any location or multiple locations in network environment 100. The computer system 650 can be included in any suitable resource in network environment 100 to implement functionality as discussed herein.

Note that each of the other functions as discussed herein can be executed in a respective computer system based on execution of corresponding instructions. For example, communication device can include respective computer readable storage medium and processor hardware to execute the operations performed by communication device 110-1.

Functionality supported by the different resources will now be discussed via flowcharts in FIGS. 7, 8, and 9. Note that the steps in the flowcharts below can be executed in any suitable order.

Figure 7:
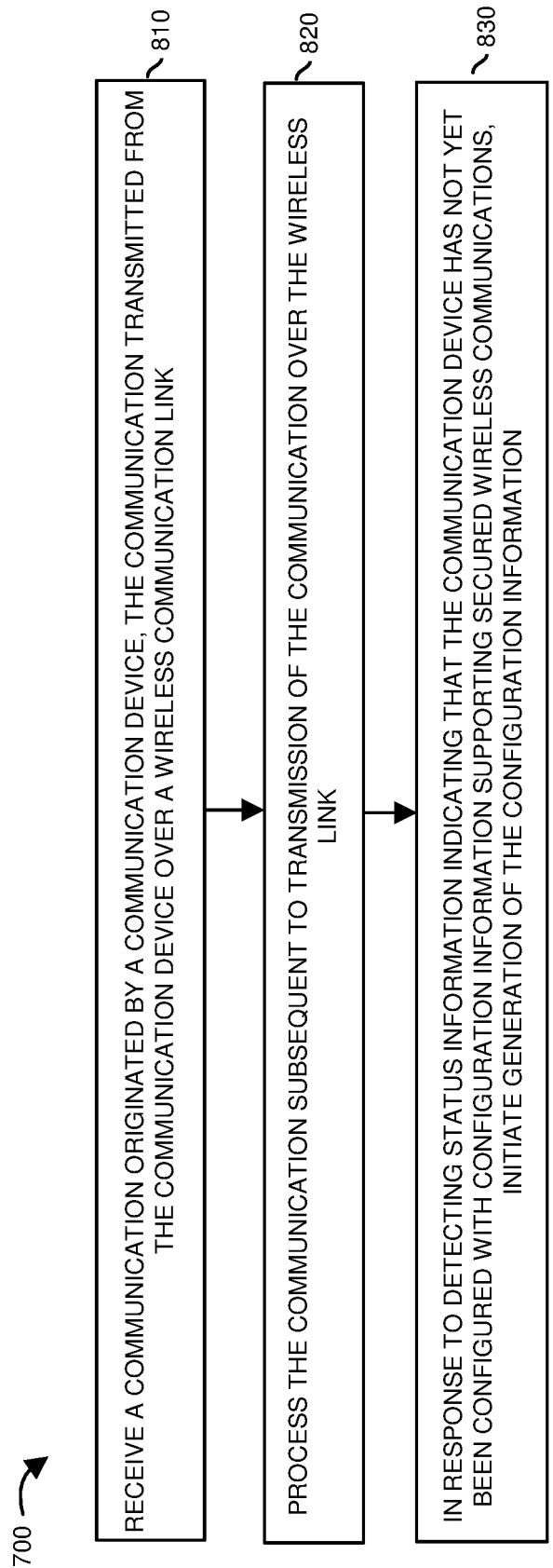
FIG. 7 is an example diagram illustrating a method of provisioning configuration information supporting subsequent secured wireless communications according to embodiments herein.

FIG. 7 is a flowchart 700 illustrating an example method according to embodiments. Note that there will be some overlap with respect to concepts as discussed above.

In processing block 710, the message-processing resource 140 receives a communication 111 originated by a communication device 120-1. The communication 111 is transmitted from the communication device 120-1 over a wireless communication link 128-1.

In processing block 720, the message-processing resource 140 processes the communication 111 subsequent to transmission of the communication 111 over the wireless link 128-1.

In processing block 730, in response to detecting status information indicating that the communication device 120-1 has not yet been configured with configuration information 191 supporting secured wireless communications, the message-processing resource 140 initiates generation and provisioning of the configuration information 191.

Figure 8:
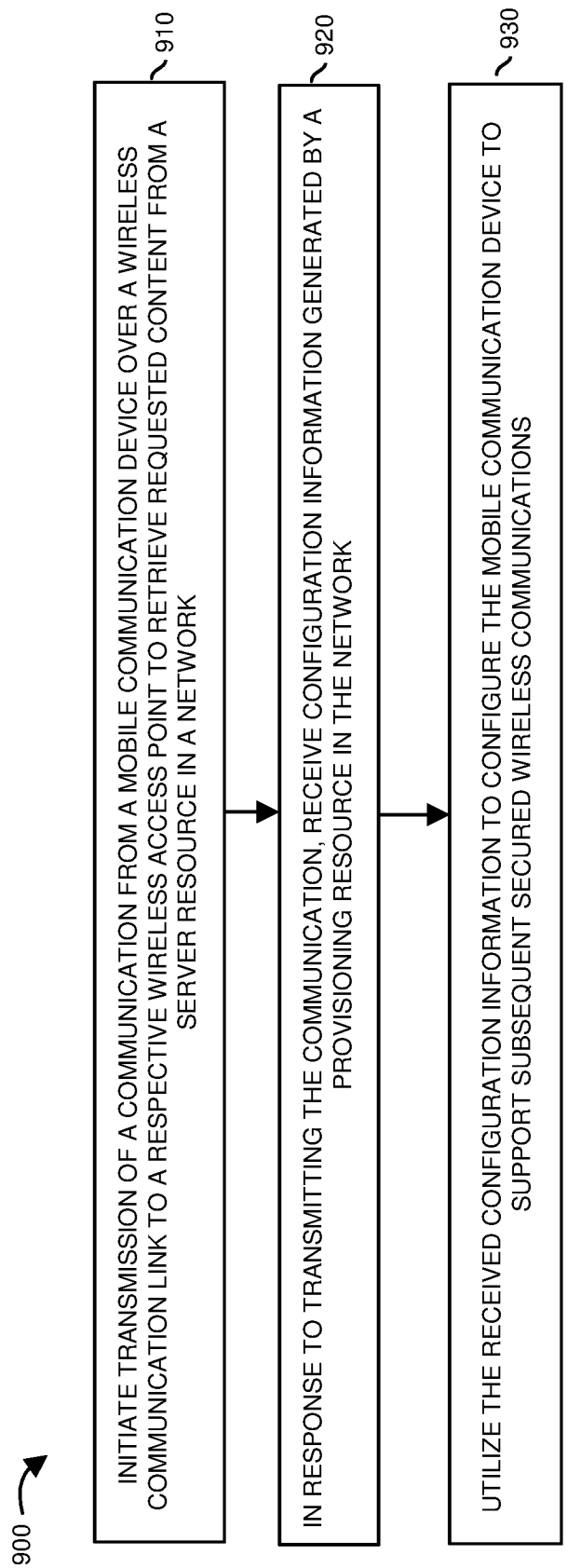
FIG. 8 is an example diagram illustrating a method of provisioning configuration information supporting subsequent secured wireless communications according to embodiments herein.

FIG. 8 is a flowchart 800 illustrating an example method according to embodiments. Note that there will be some overlap with respect to concepts as discussed above.

In processing block 810, the communication device 120-1 initiates transmission of a communication 111 over a wireless communication link 128-1 to a respective wireless access point 105-1 to retrieve requested content from a server resource 195-1 in network 190-1.

In processing block 820, in response to transmitting the communication 111, the communication device 120-1 receives configuration information 191 generated by a provisioning resource 150 in the network environment 100.

In processing block 830, the communication device 120-1 utilizes the received configuration information 191 to configure the mobile communication device 120-1 to support subsequent secured wireless communications as indicated by the configuration information 191.

Figure 9:
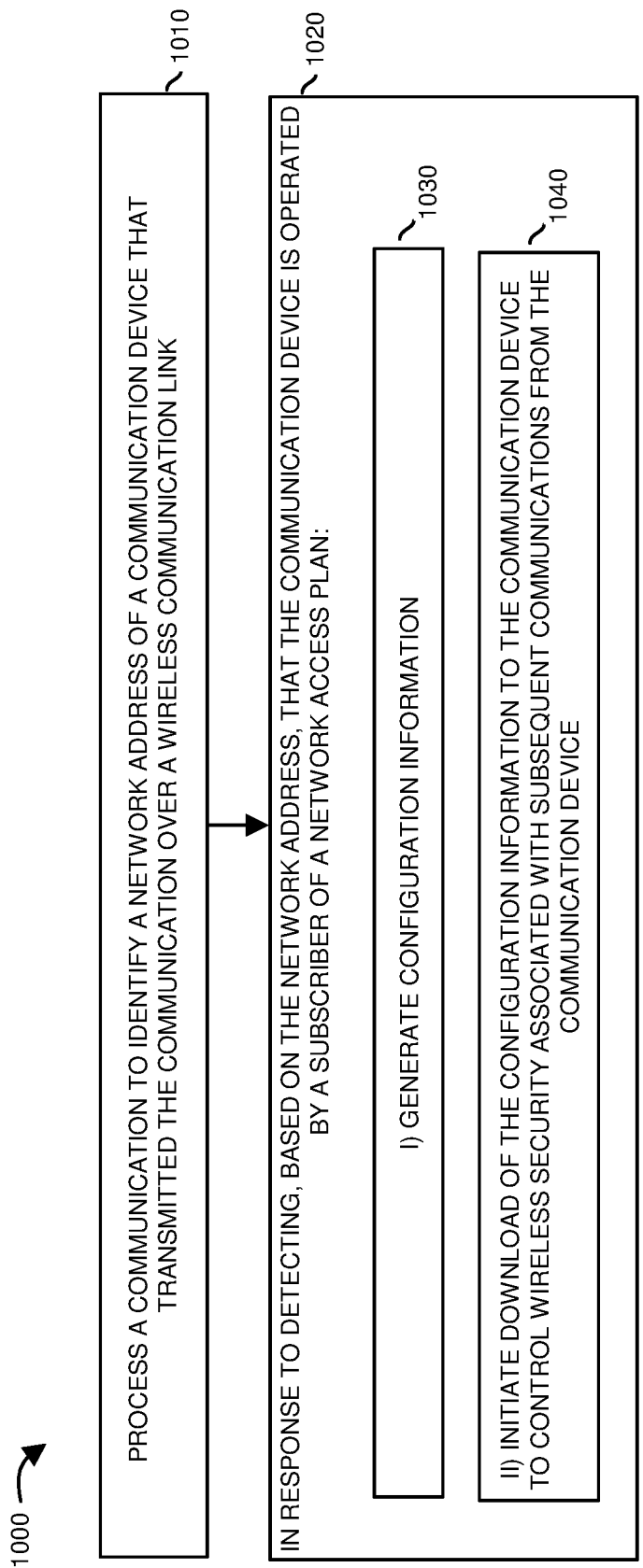
FIG. 9 is an example diagram illustrating a method of provisioning configuration information supporting subsequent secured wireless communications according to embodiments herein.

FIG. 9 is a flowchart 900 illustrating an example method according to embodiments. Note that there will be some overlap with respect to concepts as discussed above.

In processing block 910, the message-processing resource 140 process a communication 111 to identify a network address ABCD of a communication device 120-1 that transmitted the communication 111 over a wireless communication link 128-1.

In processing block 920, in response to detecting, based on the network address ABCD, that the communication device 120-1 is operated by a subscriber of a network access plan: i) the provisioning resource 150 in processing block 930 generates configuration information 191, and ii) the provisioning resource 150 in processing block 940 initiates downloading of the configuration information 191 to the communication device 120-1 to control wireless security associated with subsequent communications from the communication device 120-1.

Note again that techniques herein are well suited for configuring one or more communication devices operated in a respective network environment 100. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    transmitting a communication from a mobile communication device over a wireless communication link to a respective wireless access point;
    in response to transmitting the communication, receiving configuration information at the mobile communication device. the configuration information generated by a provisioning resource, the configuration information including authentication credentials supporting a particular wireless communication protocol;
    utilizing the received configuration information to configure the mobile communication device to support subsequent secured wireless communications with the respective wireless access point via the particular wireless communication protocol;
    wherein the communication includes a network address of a target source from which the mobile communication device requests retrieval of content; and
    wherein the mobile communication device receives the configuration information from a message processing resource that intercepts the communication and communicates the configuration information over the wireless communication link to the mobile communication device in response to detecting that: i) an operator of the mobile communication device subscribes to a network in which the respective wireless access point resides, and ii) the mobile communication device has not yet been provisioned to support the particular wireless communication protocol through the respective wireless access point.

2. The method as in claim 1, wherein transmitting the communication from the mobile communication device includes: communicating a unique identifier value in the communication transmitted from the mobile communication device over the wireless communication link, the unique identifier value assigned to the mobile communication device.

3. The method as in claim 1, wherein the communication is a request for content from a server resource in a network.

4. The method as in claim 3 further comprising:
    receiving the configuration information prior to receiving the requested content.

5. The method as in claim 3 further comprising:
    receiving the configuration information and the requested content in response to transmitting the communication.

6. The method as in claim 1, wherein an operator of the mobile communication device establishes the wireless communication link with the respective wireless access point using an open SSID (Service Set IDentifier).

7. The method as in claim 1, wherein an operator of the mobile communication device establishes the wireless communication link with the respective wireless access point via use of a secured SSID (Service Set Identifier) that is temporarily allocated for use by the operator to access a network in which the respective wireless access point resides.

8. The method as in claim 1, wherein the communication includes a request for retrieval of content unrelated to provisioning of the configuration information to the mobile communication device.

9. The method as in claim 8, wherein the mobile communication device has not yet been provisioned with the configuration information at a time of transmitting the communication over the wireless communication link.

10. The method as in claim 9, wherein the authentication credentials include a password for use by the mobile communication device to authenticate the mobile communication device to support the subsequent secured wireless communications with the respective wireless access point.

11. The method as in claim 1, wherein the mobile communication device is automatically provisioned with the configuration information generated by the provisioning resource in response to the provisioning resource detecting that the mobile communication device has not yet been provisioned to support the particular wireless communication protocol.

12. The method as in claim 11, wherein the respective wireless access point supports the subsequent secured wireless communications with the mobile communication device via the particular wireless communication protocol.

13. The method as in claim 12, wherein the authentication credentials include a password to authenticate the mobile communication device.

14. The method as in claim 1, wherein the respective wireless access point is a first wireless access point;
wherein the first wireless access point resides in a network of multiple wireless access points including the first wireless access point and a second wireless access point, the method further comprising:
via the mobile communication device, utilizing the configuration information to establish second wireless connectivity between the mobile communication device and the second wireless access point.

15. The method as in claim 1, wherein the mobile communication device establishes the wireless communication link with the respective wireless access point via open authentication in which the mobile communication device is not required to provide authentication credentials.

16. The method as in claim 1, wherein detection that the operator of the mobile communication device subscribes to the network includes detecting presence of the source network address in subscriber information associated with the operator; and
wherein detection that the mobile communication device has not yet been provisioned to support the particular wireless communication protocol includes, via the subscriber information, mapping the source network address to status information indicating that the mobile communication device has not yet been provisioned to support the particular wireless communication protocol through the respective wireless access point.

* * * * *

UNITED STATES PATENT AND TRADEMARK OFFICE
CERTIFICATE OF CORRECTION

PATENT NO. : 12,289,199 B2
APPLICATION NO. : 17/141380
DATED : April 29, 2025
INVENTOR(S) : Qiang Zhang and Arun Manroa Page 1 of 1

It is certified that error appears in the above-identified patent and that said Letters Patent is hereby corrected as shown below:

In the Claims

Column 19, Line 67, Claim 1:
Replace "device." with --device,--

Signed and Sealed this
Twenty-ninth Day of July, 2025

Coke Morgan Stewart
*Acting Director of the United States Patent and Trademark Office*